(12) United States Patent
Ju et al.

(10) Patent No.: US 11,686,462 B2
(45) Date of Patent: Jun. 27, 2023

(54) LAMP ASSEMBLY, LAMP SYSTEM, METHOD FOR ASSEMBLING LAMP SYSTEM, AND METHOD FOR DISASSEMBLING LAMP SYSTEM

(71) Applicant: Radiant Opto-Electronics Corporation, Kaohsiung (TW)

(72) Inventors: Chih-Hung Ju, Kaohsiung (TW); Guo-Hao Huang, Kaohsiung (TW); Chun-Yi Sun, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 17/655,995

(22) Filed: Mar. 22, 2022

(65) Prior Publication Data

US 2022/0214032 A1 Jul. 7, 2022

Related U.S. Application Data

(63) Continuation of application No. PCT/CN2021/119154, filed on Sep. 17, 2021.

(30) Foreign Application Priority Data

Sep. 18, 2020 (WO) ................ PCT/CN2020/116307

(51) Int. Cl.
*F21V 23/06* (2006.01)
*F21V 21/008* (2006.01)
*F21V 8/00* (2006.01)

(52) U.S. Cl.
CPC ............ *F21V 23/06* (2013.01); *F21V 21/008* (2013.01); *G02B 6/0088* (2013.01)

(58) Field of Classification Search
CPC ...... F21V 23/06; F21V 21/008; G02B 6/0088
See application file for complete search history.

(56) References Cited

U.S. PATENT DOCUMENTS 6,169,373 B1 * 1/2001 Riesinger .............. F21L 14/023
315/307
9,091,401 B2 * 7/2015 Wong .................... F21V 14/025
(Continued)

FOREIGN PATENT DOCUMENTS

| CN | 103629579 A | 3/2014 |
| CN | 105026825 A | 11/2015 |

(Continued)

*Primary Examiner* — Mary Ellen Bowman
(74) *Attorney, Agent, or Firm* — CKC & Partners Co., LLC (57) ABSTRACT

A lamp assembly, a lamp system, a method for assembling lamp system, and a method for disassembling lamp system are provided. The lamp assembly includes a lamp and a connector assembly. The lamp includes a frame body, a light source assembly, and an electrical connector assembly. The frame body has an accommodating space. The light source assembly is fixed on the frame body. The electrical connector assembly is disposed in the accommodating space and is connected to the light source assembly. The electrical connector assembly includes a first connector and a second connector, and the first connector and the second connector are connected to each other by a power wire and a signal wire. The connector assembly includes an electrical connecting member. The connector assembly is configured to be connected to the aforementioned lamp and another lamp through the electrical connecting member.

12 Claims, 5 Drawing Sheets

(56) References Cited

U.S. PATENT DOCUMENTS

| | | | | |
|---|---|---|---|---|
| 9,228,708 B2* | 1/2016 | Dings | | F21S 4/28 |
| 2005/0090124 A1* | 4/2005 | Mohacsi | | F21S 2/00 |
| | | | | 439/35 |
| 2007/0091596 A1* | 4/2007 | Grossman | | F21V 23/002 |
| | | | | 362/217.09 |
| 2008/0239730 A1* | 10/2008 | Chien | | F21L 14/02 |
| | | | | 362/368 |
| 2010/0039801 A1* | 2/2010 | Pelletier | | F21L 2/00 |
| | | | | 362/184 |
| 2011/0157882 A1* | 6/2011 | Wessel | | F21L 4/027 |
| | | | | 362/205 |
| 2012/0176767 A1* | 7/2012 | Whitfield | | F21L 14/023 |
| | | | | 362/33 |
| 2013/0094196 A1* | 4/2013 | Wessel | | F16M 11/10 |
| | | | | 362/198 |
| 2014/0140050 A1* | 5/2014 | Wong | | F21V 14/025 |
| | | | | 362/217.1 |
| 2016/0033098 A1 | 2/2016 | Bergman et al. | | |
| 2016/0356439 A1* | 12/2016 | Inskeep | | F21V 21/30 |
| 2019/0064426 A1 | 2/2019 | Ju et al. | | |
| 2019/0195445 A1* | 6/2019 | Chien | | H01R 33/92 |
| 2021/0033248 A1* | 2/2021 | Cacciabeve | | F21V 21/30 |

FOREIGN PATENT DOCUMENTS

| | | |
|---|---|---|
| CN | 106051477 A | 10/2016 |
| CN | 108224138 A | 6/2018 |
| CN | 110285368 A | 9/2019 |
| CN | 110546426 A | 12/2019 |
| CN | 110945286 A | 3/2020 |
| JP | 2006100074 A | 4/2006 |
| JP | 2012256481 A | 12/2012 |
| KR | 20180065845 A | 6/2018 |
| TW | M367292 U | 10/2009 |
| TW | 201708769 A | 3/2017 |
| TW | 202014637 A | 4/2020 |
| WO | 2017097846 A1 | 6/2017 |

* cited by examiner

LAMP ASSEMBLY, LAMP SYSTEM, METHOD FOR ASSEMBLING LAMP SYSTEM, AND METHOD FOR DISASSEMBLING LAMP SYSTEM

RELATED APPLICATIONS

This application is a continuation application of International Application No. PCT/CN2021/119154 filed on Sep. 17, 2021 which claims priority to International Application No. PCT/CN2020/116307 filed on Sep. 18, 2020. The entire disclosures of all the above applications are hereby incorporated by reference.

BACKGROUND

Field of Invention

The present disclosure relates to a light-emitting device, and more particularly, to a lamp assembly, a lamp system, a method for assembling a lamp system, and a method for disassembling a lamp system.

Description of Related Art

In response to market demand, the variations of lamps are becoming more and more diverse. There is a pendant transparent lamp, which can achieve lighting and aesthetic effects at the same time.

However, most of the typical pendant lamps use cables as power connections. If various pendant hanging lamps are used at the same time, each detached pendant lamp needs to be powered through its own cable to emit light. The exposed cables increase the complexity of assembly, increase costs, and lead to cluttered visual effects in the space.

When several lamps are required to be connected in series, although only one single cable is required, it will result in a higher system cost because an appropriate number of lamps and lamp intervals cannot be used. If a track system is used to connect several lamps in series, there will be a disadvantage that track construction costs for the track system is expensive. In addition, when the lamp itself needs to expand other non-main lighting functions and needs to be connected to external devices, a problem of integration difficulty arises due to a factor of an outer frame of the lamp.

SUMMARY

Therefore, one object of the present disclosure is to provide a lamp assembly that can be rapidly assembled and disassembled, thereby effectively saving system construction costs.

According to the aforementioned objectives of the present disclosure, a lamp assembly is provided. The lamp assembly includes a lamp and a connector assembly. The lamp includes a frame body, a light source assembly, and an electrical connector assembly. The frame body has an accommodating space. The light source assembly is fixed on the frame body. The electrical connector assembly is disposed in the accommodating space and is connected to the light source assembly, in which the electrical connector assembly includes a first connector and a second connector, and the first connector and the second connector are connected to each other by a power wire and a signal wire. The connector assembly includes an electrical connecting member, in which the connector assembly is configured to be connected to the lamp and another lamp by the electrical connecting member.

According to one embodiment of the present disclosure, the electrical connecting member of the connector assembly includes a third connector and a fourth connector, and the third connector and the fourth connector are connected to each other by another power wire and another signal wire. The third connector of the connector assembly is electrically and signally connected to the second connector of the lamp, and the fourth connector is electrically and signally connected to the another lamp.

According to one embodiment of the present disclosure, the connector assembly further includes an external terminal which is connected between the third connector and the fourth connector, and the external terminal is electrically and signally connected to an external device.

According to one embodiment of the present disclosure, the lamp has a length L, and the connector assembly has a length P, in which the length L of the lamp and the length P of the connector assembly satisfy the following conditions:

$$-8P^2 + 6L \times P - 0.9L^2 > 0.$$

According to one embodiment of the present disclosure, the lamp is hung obliquely above a target object, and an included angle θ is defined between a line connecting a bottom of the lamp and a top of the target object and a vertical line, in which the length L of the lamp, and the length P of the connector assembly, and the included angle θ satisfy the following conditions:

$$\frac{1}{8}\tan\theta < -8P^2 + 6L \times P - 0.9L^2 < \frac{1}{2}\tan\theta.$$

According to one embodiment of the present disclosure, the connector assembly includes a casing and a bottom cover. The casing has an inner space, and the bottom cover is configured to open or close the inner space. The electrical connecting member is disposed in the inner space.

According to one embodiment of the present disclosure, the light source assembly includes a light-emitting unit and a light guide plate, in which the light-emitting unit is disposed in the accommodating space, the light guide plate is connected to the frame body, and a light incident surface of the light guide plate is adjacent to the light-emitting unit.

According to one embodiment of the present disclosure, the lamp assembly further includes a supporting member, in which a top surface of the lamp and a top surface of the connector assembly respectively have a groove, one portion of the supporting member is embedded in the groove of the lamp, and the other portion of the supporting member is embedded in the groove of the connector assembly.

According to one embodiment of the present disclosure, the lamp and the connector assembly respectively have a suspension member.

According to the aforementioned objectives of the present disclosure, a lamp system is further provided. The lamp system includes at least two lamps of and at least one connector assembly of the aforementioned lamp assembly.

According to one embodiment of the present disclosure, the first connector of an endmost one of the lamps is connected to an external power source. The electrical connector assembly of each of the rest of the lamps is connected to the electrical connecting member of its adjacent connector assembly so as to form a connection with the endmost one of the lamps.

According to the aforementioned objectives of the present disclosure, a method for assembling a lamp system is further provided, which includes the following steps. The aforementioned lamp system is provided. The suspension members located on two opposite ends of a main lamp of the lamps are hanged to a ceiling, in which the first connector of the electrical connector assembly of the main lamp is connected to an external power source. A first end of the connector assembly is electrically and signally connected to the second connector of the main lamp, and a suspension member located on a second end of the connector assembly is hanged to the ceiling. The first connector of a secondary lamp of the lamps is electrically and signally connected to the second end of the connector assembly, and a suspension member located on an end of the secondary lamp away from the connector assembly is hanged to the ceiling.

According to the aforementioned objectives of the present disclosure, a method for disassembling a lamp system is further provided, which includes the following steps. The aforementioned lamp system is provided. The electrical connector assembly of one of the lamps of the lamp system desired to be disassembled is separated from the electrical connecting member of the connector assembly, in which one end of the one of the lamps is fixed by the suspension member. The suspension member and the one of the lamps is separated to remove the one of the lamps.

It can be known from the above that the lamp system of the present disclosure mainly uses the design of the electrical connecting members of the connector assembly and the lamp to achieve an electric and signal transmission function required for the jump connection and function expansion of the lamps, thereby effectively saving the system cost, and completing the electrical connection between lamps or between the lamps and external devices in a simple installation method.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
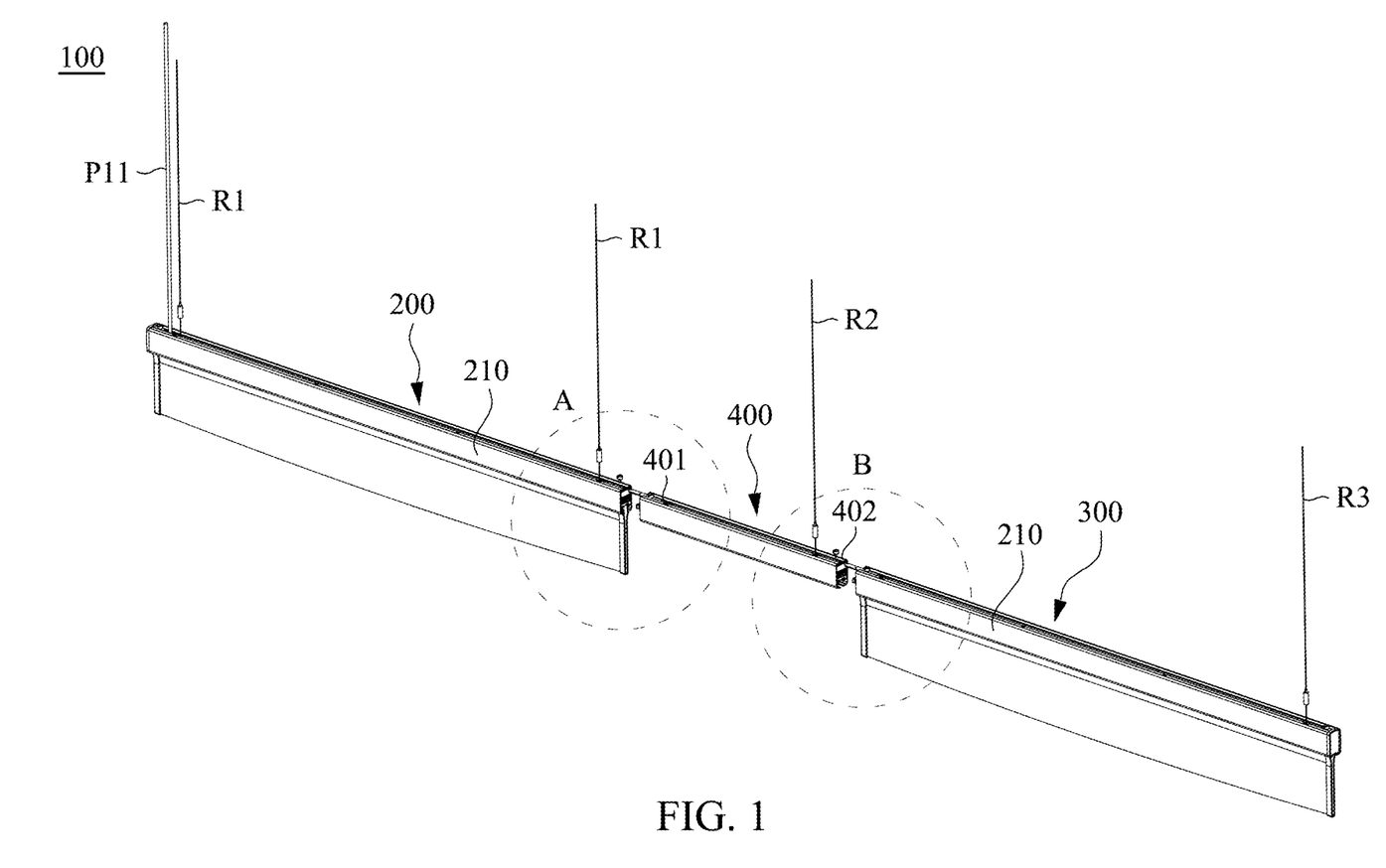
FIG. 1 is a schematic structural diagram showing a lamp system in accordance with an embodiment of the present disclosure.
Figure 2:
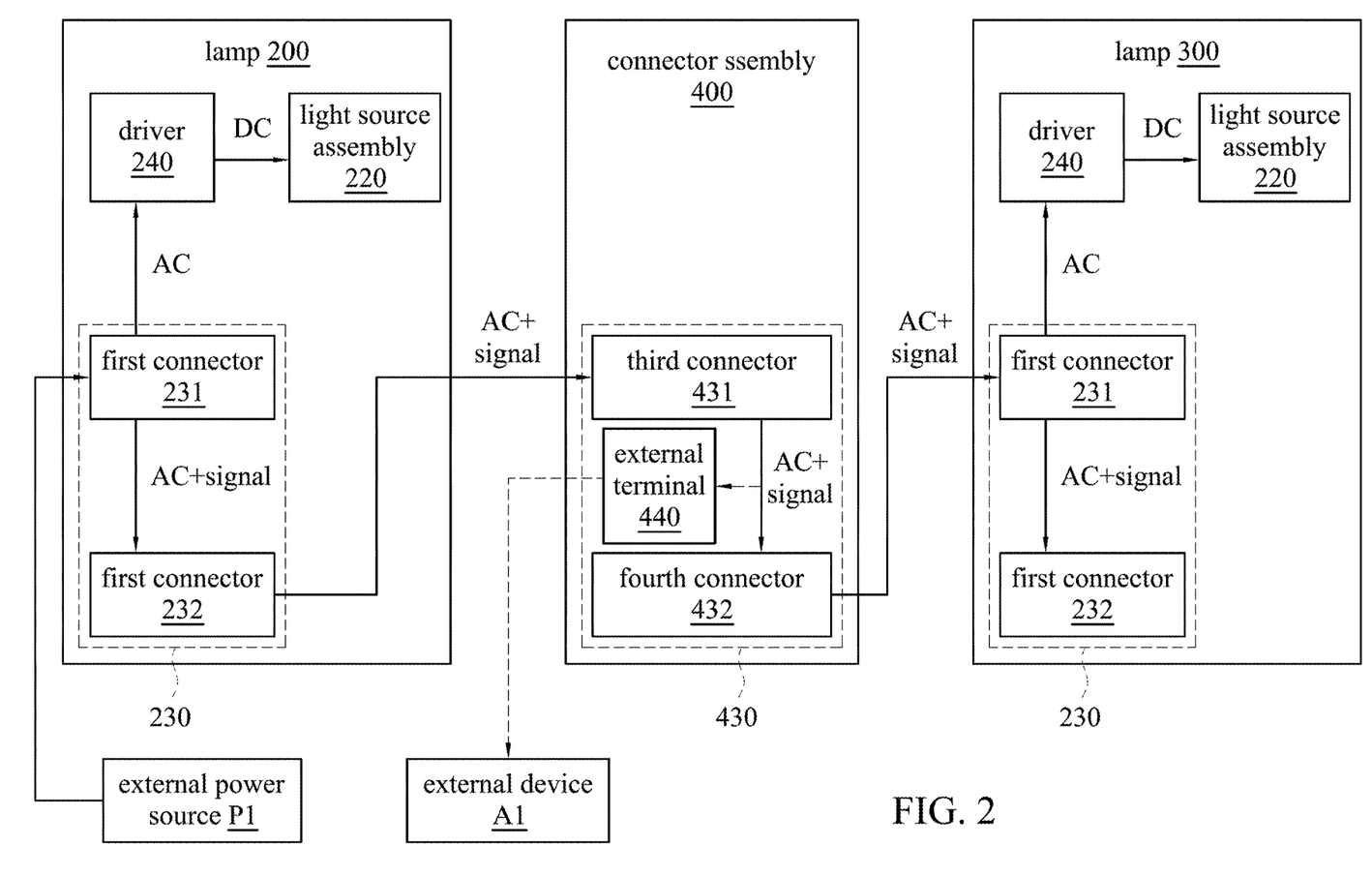
FIG. 2 is a schematic block diagram showing a lamp system in an assembled state in accordance with an embodiment of the present disclosure.

Referring to FIG. 1 and FIG. 2, FIG. 1 is a schematic structural diagram showing a lamp system 100 in accordance with an embodiment of the present disclosure, and FIG. 2 is a schematic block diagram showing the lamp system 100 in an assembled state in accordance with an embodiment of the present disclosure. The lamp system 100 of the present embodiment mainly includes at least two lamps (such as a lamp 200 and a lamp 300) and at least one connector assembly 400. It is noted that, the lamp 200 and the lamp 300 have substantially the same structures, and the same reference numbers used in the drawings and the description are referred to the same or like parts. The lamp 200 and the lamp 300 are connected in series by the connector assembly 400.

Figure 3:
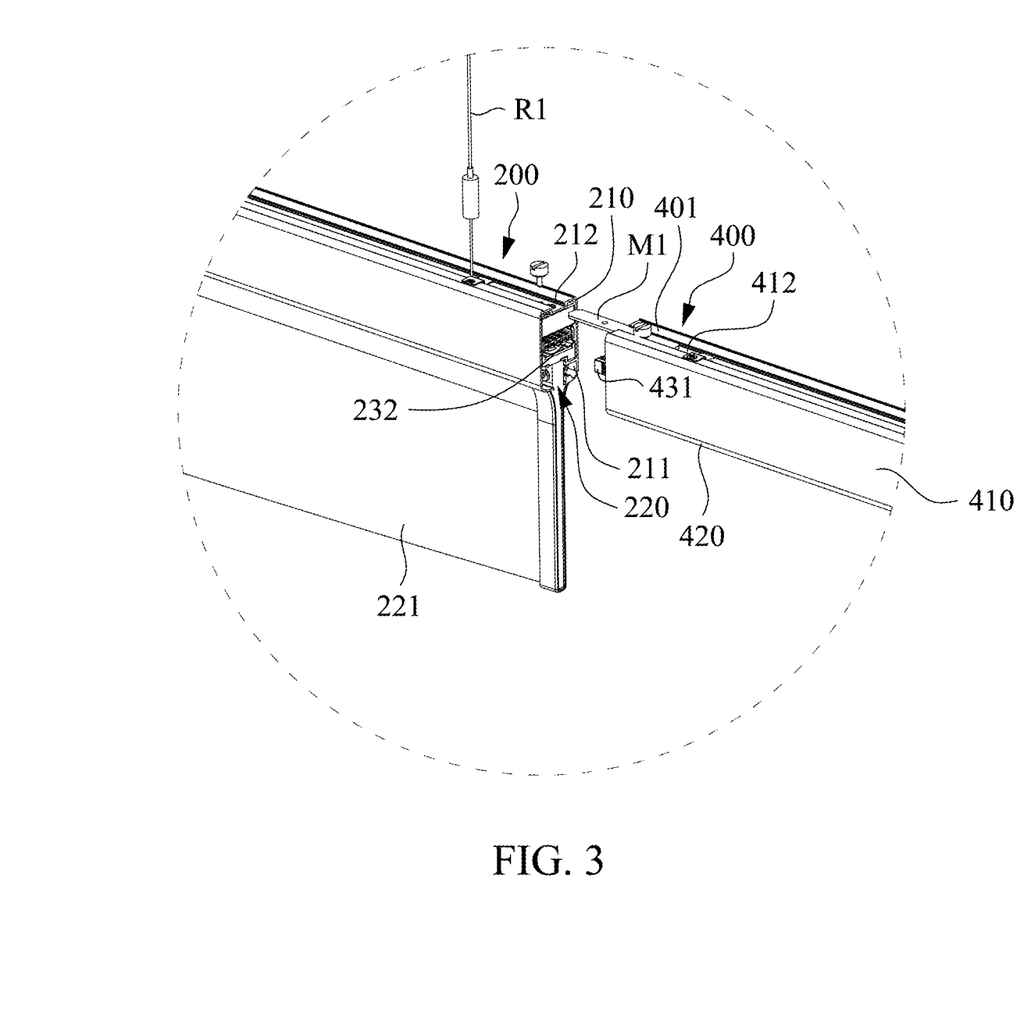
FIG. 3 is an enlarged view of zone "A" in FIG. 1.
Figure 4:
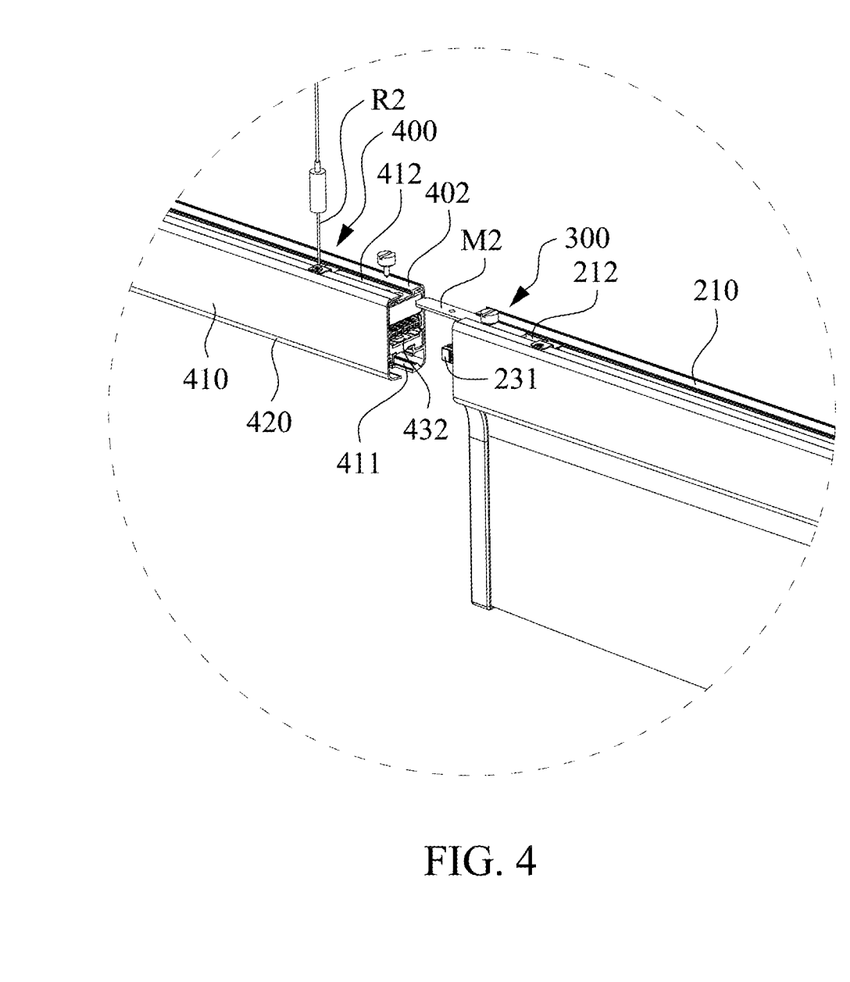
FIG. 4 is an enlarged view of zone "B" in FIG. 1.

Simultaneously referring to FIG. 2 to FIG. 4, in which FIG. 3 is an enlarged view of zone "A" in FIG. 1, and FIG. 4 is an enlarged view of zone "B" in FIG. 1. The lamp 200 (or lamp 300) includes a frame body 210, a light source assembly 220, and an electrical connector assembly 230. The frame body 210 has an accommodating space 211. The light source assembly 220 is fixed on the frame body 210. In one embodiment, the light source assembly 220 includes a light-emitting unit (not shown) and a light guide plate 221, in which the light-emitting unit is a LED bar which is disposed in the accommodating space 211 of the frame body 210. A portion of the light guide plate 221 near a light-incident surface is located in the accommodating space 211, and the light-emitting unit is disposed adjacent to the light-incident surface of the light guide plate 221 and is used to provide light to the light guide plate 221.

Referring to FIG. 2 to FIG. 4, in the present embodiment, the electrical connector assembly 230 is disposed in the accommodating space 211 of the frame body 210 and is electrically and signally connected to the light source assembly 220. The electrical connector assembly 230 includes a first connector 231 and a second connector 232, and the first connector 231 and the second connector 232 are connected to each other by a power wire and a signal wire. In one example, the first connector 231 and the second connector 232 are connected to each other by two power wires, two signal transmissions and a grounding wire. It is noted that, signal transmission in the present disclosure can be implemented according to a Digital Addressable Lighting Interface (DALI) standard, a Power Line Communication (PLC) standard, a Controller Area Network (CAN) standard, RS-485 standard, DMX, I2C, RS-232, Ethernet, exclusive protocol or other protocols known by those skilled in the art as a transmission manner. According to the above-mentioned framework, multiple control signals can be communicated by, for example, a private, a shared, and/or dedicated communication network, such as DALI or DMX, to control the lamp 200 or adjust the lamp 200 (or lamp 300) to open or close, or to adjust the brightness, the color temperature, the flickering mode or other functions of the lamp 200 (or lamp 300). As shown in FIG. 2, the first connector 231 is connected to the light source assembly 220, and there is a driver 240 disposed between the first connector 231 and the light source assembly 220. The driver 240 is configured to convert the alternating current (AC) to direct current (DC) which can be used by the light source assembly 220.

In the present embodiment, the first connector 231 and the second connector 232 are disposed in the accommodating space 211 of the frame body 210 and are respectively located at two opposite ends of the frame body 210. The first connector 231 and the second connector 232 of the lamp 200 (or lamp 300) are electrically and signally connected to their adjacent connector assembly 400 respectively. More specifically, the connector assembly 400 has opposing first end 401 and second end 402. The lamp 200 is disposed adjacent to the first end 401 of the connector assembly 400 and is electrically and signally connected to the connector assembly 400. The lamp 300 is disposed adjacent to the second end 402 of the connector assembly 400 and is electrically and signally connected to the connector assembly 400.

Referring to FIG. 2 to FIG. 4, the connector assembly 400 includes a casing 410, a bottom cover 420 and an electrical connecting member 430. As shown in FIG. 4, the casing 410 has an inner space 411. The electrical connecting member 430 is disposed in the inner space 411 of the casing 410. As shown in FIG. 2, the electrical connecting member 430 includes a third connector 431 and a fourth connector 432, and the third connector 431 and fourth connector 432 are connected to each other by a power wire and a signal wire. In the present embodiment, the third connector 431 is located at the first end 401 of the connector assembly 400, and the fourth connector 432 is located at the second end 402 of the connector assembly 400. When the lamp 200 is connected to the first end 401 of the connector assembly 400, the accommodating space 211 of the frame body 210 of the lamp 200 is communicated with the inner space 411 of the casing 410 of the connector assembly 400. Moreover, when the lamp 300 is connected to the second end 402 of the connector assembly 400, the accommodating space 211 of the frame body 210 of the lamp 300 is communicated with the inner space 411 of the casing 410 of the connector assembly 400. Meanwhile, the second connector 232 of the lamp 200 is electrically and signally connected to the third connector 431 at the first end 401 of the connector assembly 400, and the first connector 231 of the lamp 300 is electrically and signally connected to the fourth connector 432 at the second end 402 of the connector assembly 400.

As shown in FIG. 2, in one embodiment, the connector assembly 400 further includes an external terminal 440. The external terminal 440 is connected between the third connector 431 and the fourth connector 432, and the external terminal 440 is configured to be connected with an external device A1. In some embodiments, the external terminal 440 may be disposed in the inner space 411 of the casing 410 of the connector assembly 400, or may extend outside of the casing 410 of the connector assembly 400. In some examples, the external device A1 can be a device with non-lighting functions. For example, the external device A1 can be a speaker device, an emergency exit light, hanging placard device, monitoring device, or rechargeable battery, etc. In other examples, the external device A1 can be a device with an environmental sensing function. For example, the external device A1 can be an environment sensor, a motion sensor, or a color sensor, etc. Before the external device A1 is installed to the connector assembly 400, the bottom cover 420 is first removed from the casing 410. Thereafter, the external device A1 is connected to the external terminal 440 of the connector assembly 400, and the bottom cover 420 is then mounted to the casing 410.

Referring to FIG. 3 and FIG. 4 again, in the present embodiment, the lamp 200 includes a supporting member M1, and the lamp 300 includes a supporting member M2. Top portions of the lamp 200 and the lamp 300 respectively have a groove 212, and top portion of the casing 410 of the connector assembly 400 also has a groove 412. When the lamp 200 is connected to the first end 401 of the connector assembly 400, one portion of the supporting member M1 is embedded in the groove 212 on the frame body 210 of the lamp 200, and the other portion of the supporting member M1 is embedded in the groove 412 on the casing 410 of the connector assembly 400 and is near the first end 401. Similarly, when the lamp 300 is connected to the second end 402 of the connector assembly 400, one portion of the supporting member M2 is located in the groove 212 on the frame body 210 of the lamp 300, and the other portion of the supporting member M2 is located in the groove 412 of the connector assembly 400 and is near the second end 402.

Referring to FIG. 1 to FIG. 4, the present disclosure further provides a method for assembling a lamp system. The method mainly includes the following steps. At first, at least two aforementioned lamps, such as the lamp 200 and the lamp 300, and a connector assembly 400 are provided. In the present embodiment, the lamp 200 is used as a main lamp, and the lamp 300 is used as a secondary lamp. Thereafter, two opposing sides of the main lamp 200 are fixed to the ceiling by respectively using a suspension member R1, and the first connector 231 of the electrical connector assembly 230 on the main lamp 200 is connected to an external power source P1 through a power wire P11. In the present embodiment, the external power source P1 is an AC power source. Then, the third connector 431 on the first end 401 of the connector assembly 400 is electrically connected to the second connector 232 of the main lamp 200, and the second end 402 of the connector assembly is fixed to the ceiling through the suspension member R2. As shown in FIG. 3, before the connector assembly 400 is connected to the main lamp 200, the supporting member M1 is inserted into the groove 212 on the frame body 210 of the main lamp 200. Therefore, when the connector assembly 400 is mounted on the lamp 200, one portion of the supporting member M1 is embedded in the groove 212 on the frame body 210 of the lamp 200, and the other portion of the supporting member M1 is embedded in the groove 412 on the casing 410 of the connector assembly 400, thereby increasing an engagement stability between the lamp 200 and the connector assembly 400.

After the connector assembly 400 is connected to the main lamp 200, the first connector 231 of the secondary lamp 300 is connected to the fourth connector 432 on the second end 402 of the connector assembly 400, and an end of the secondary lamp 300 away from the connector assembly 400 is fixed to the ceiling through the suspension member R3, so as to finish the installation of the lamp system 100. As shown in FIG. 4, before the secondary lamp 300 is connected to the connector assembly 400, the supporting member M2 is inserted into the groove 412 on the casing 410 of the connector assembly 400. Therefore, when the secondary lamp 300 is mounted on the connector assembly 400, one portion of the supporting member M2 is embedded in the groove 412 on the casing 410 of the connector assembly 400, and the other portion of the supporting member M2 is embedded in the groove 212 on the frame body 210 of the lamp 300, thereby increasing an engagement stability between the lamp 300 and the connector assembly 400.

In the present embodiment, the lamp is a first lamp (i.e., the endmost lamp) which is connected to the external power source P1. Therefore, the power provided by the external power source P1 which is transmitted from the electrical connector assembly 230 of the lamp 200 to the connector assembly 400 can be further transmitted from the electrical connecting member 430 of the connector assembly 400 to the lamp 300, thereby electrically connecting the lamp 200, the connector assembly 400 and the lamp 300 together. If there are another connector assembly and another lamp to be connected to the lamp 300, the power transmitted to the lamp 300 can be further transmitted to the another connector assembly or the another lamp by the electrical connector assembly 230 of the lamp 300. Therefore, only one external power source is used to provide power for multiple lamps and connector assemblies instead of setting up multiple external power sources on each lamp or each connector assembly, thereby forming a lamp system with simple wiring structure as well as easy-to-assemble and time-saving advantages. In some embodiments, when the function of the lamp system 100 needs to be expanded, it is only necessary to connect the external device A1 to the external terminal 440 of the connector assembly 400, and no additional external power source or wires need to be used.

In other embodiments, when there is only one lamp 200, two suspension member R1 are respectively disposed on two opposing ends of the lamp 200 so as to be fixed on the ceiling. When the function of the lamp system 100 needs to be expanded, the aforementioned method for assembling the lamp system can be used to connect the connector assembly 400 and the lamp 300 to the lamp 200, and only one suspension member R2 is needed to be disposed on one end (i.e., second end 402) of the connector assembly 400 away from the lamp 200, in which the other end (i.e., first end 401) of the connector assembly 400 adjacent to the lamp 200 shares a bearing load of the connector assembly 400 through a joint force generated when the third connector 431 of the connector assembly 400 and the second connector 232 of the lamp 200 are interconnected. In other embodiments, in order to increase the engagement stability, the supporting member M1 as shown in FIG. 3 can be used to connect the connector assembly 400 and the lamp 200 together. When the lamp 300 is to be installed, only one suspension member R3 is needed to be disposed on one end of the lamp 300 away from the connector assembly 400, in which the other end the lamp 300 adjacent to the connector assembly 400 shares a bearing load of the lamp 300 through a joint force generated when the first connector 231 of the lamp 300 and the fourth connector 432 of the connector assembly 400 are interconnected. In other embodiments, in order to increase the engagement stability, the supporting member M2 as shown in FIG. 4 can be used to connect the lamp 300 and the connector assembly 400 together.

The present disclosure further provides a method for disassembling a lamp system. The method mainly includes the following steps. At first, a lamp system 100 shown in FIG. 1 is provided. Then, the electrical connector assembly 230 of the lamp 300 to be disassembled is separated from its adjacent electrical connecting member 430 of the connector assembly 400, in which one end of the lamp 300 is fixed by the suspension member R3. Thereafter, the suspension member R3 is separated from the lamp 300 so as to remove the lamp 300. More specifically, when the end of the lamp 300 close to the connector assembly 400 is separated from its adjacent connector assembly 400, because the end of the lamp 300 away from the connector assembly 400 is fixed to the ceiling through the suspension member R3, the lamp 300 will not fall from the ceiling while it is being removed from the connector assembly 400. Similarly, when the connector assembly 400 is separated from its adjacent lamp 200, because the end of the connector assembly 400 away from the lamp 200 is fixed to the ceiling through the suspension member R2, the connector assembly 400 will not fall from the ceiling while it is being removed from the lamp 200. Therefore, the method for disassembling the lamp system of the present disclosure is relatively safe, and there is no need to worry about the occurrence of the lamp or the connector assembly to be disassembled falling down on the ground. In addition, by the lamp design of the present disclosure, the user can remove one of the lamps or connector assemblies from the lamp system without additionally setting or removing another suspension member, thereby simplifying the overall lamp system as well as simplifying the assembling and disassembling method.

Figure 5:
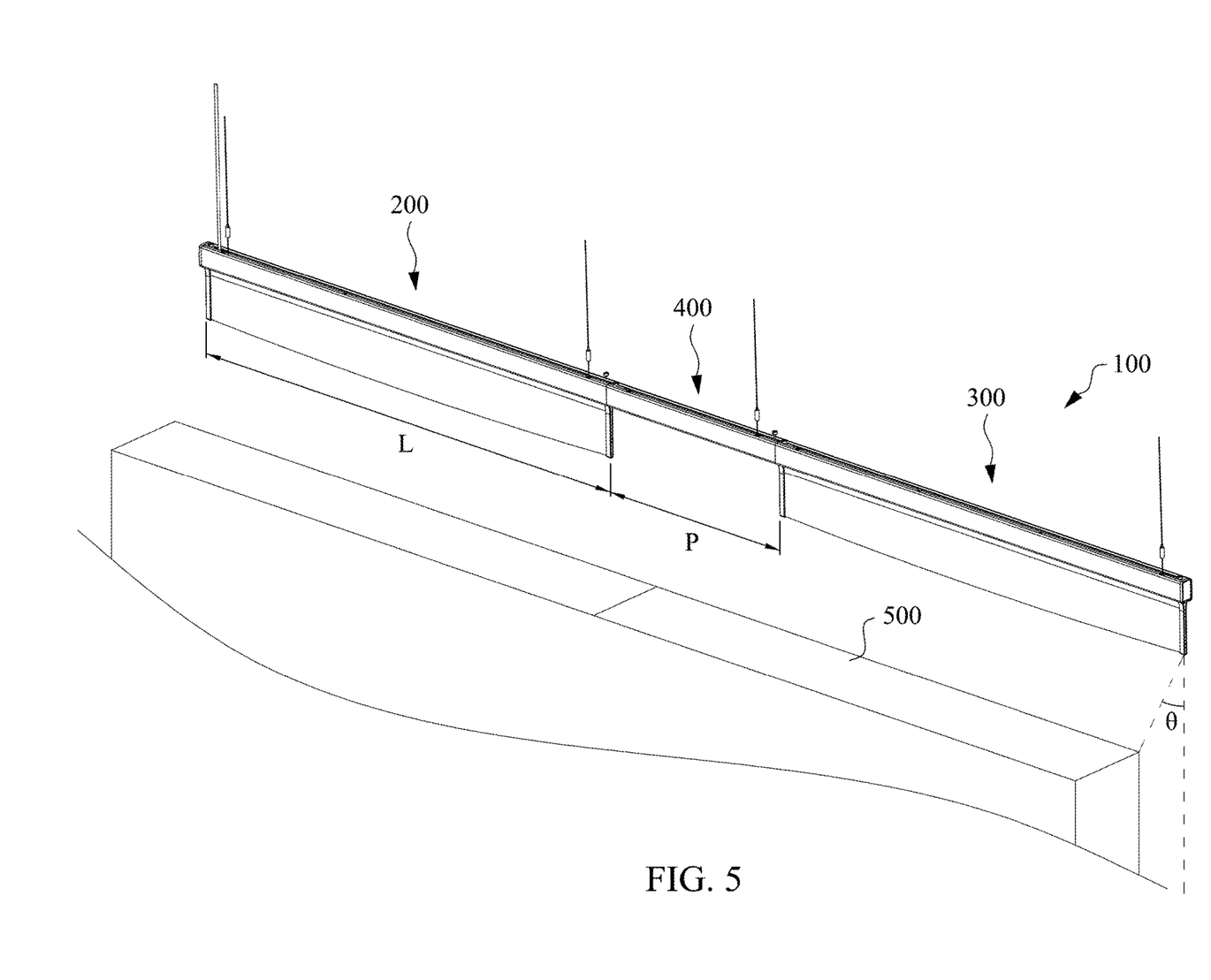
FIG. 5 is a schematic diagram showing a lamp system in a usage state in accordance with an embodiment of the present disclosure.

Referring to FIG. 5, FIG. 5 is a schematic diagram showing a lamp system in a usage state in accordance with an embodiment of the present disclosure. When the lamp system 100 of the present disclosure is applied in an environment, the lamp system 100 is located obliquely above a target object 500. In the present embodiment, the lamp 200 (or lamp 300) has a length L, and the connector assembly 400 has a length P.

The length L of the lamp 200 (or the lamp 300) and the length P of the connector assembly 400 may affect the average illuminance and uniformity (i.e., the ratio of a minimum illuminance to an average illuminance) of the light emitted by the lamp 200 (or the lamp 300) on the target object 500. In addition, the length P of the connector assembly 400 is used to determine a distance between the lamp 200 and the lamp 300. Therefore, the length L of the lamp and the length P of the connector assembly satisfy the following formula (1): $-8P^2+6L \times P-0.9L^2>0$.

In an example where the environment is a shopping mall and the target object 500 is a shelf, according to the content related to Retail premises in the Table 5.27 of the European standard for lighting of indoor workplaces EN-12464-1: 2011, limiting values for sales area (The qualified conditions for the sales area) are that the average illuminance of the placement plane of the goods (target object 500) is greater than 300 (lx), and the uniformity is greater than 0.4.

This embodiment adopts a higher standard than the European lighting standard number: EN-12464-1:2011, and requires that the average illuminance is greater than 300 (lx) and the uniformity is greater than 0.5 as a better lighting condition. Therefore, in the lamp system 100, the length L of lamp and the length P of the connector assembly can be designed according to the formula (1), so as to meet lighting requirements.

Referring to Table 1, in an example where the length of lamp L is 4 feet, the length P of the connector assembly can be designed to range from 30 cm to 60 cm, including end point values. More specifically, when the length P of the connector assembly is designed to from 30 cm to 60 cm, the results calculated from the formula (1) are all positive values. Moreover, it can also be seen from Table 2 that when the length P of the connector assembly is designed to range from 30 cm and 60 cm, the average illuminance is greater than 300 (lx) and the uniformity is greater than 0.5, which meets lighting requirements. When the length P of the connector assembly is less than 30 cm, excluding 30 cm, such as 10 cm, the result calculated by formula (1) is a negative value, and the uniformity is 0.459 which cannot meet the lighting requirement of 0.5. When the length P of the connector assembly is greater than 60 cm, excluding 60 cm, such as 70 cm, the result calculated by formula (1) is also a negative value, and the average illuminance is 291 (lx) which cannot meet the lighting requirement of 300 (lx).

TABLE 1 calculation results from formula (1)

| length of lamp L (mm) | length P of the connector assembly (mm) | results calculated from formula (1) |
| --- | --- | --- |
| 1.2192 | 0.1 | −0.69 |
|  | 0.2 | −0.19 |
|  | 0.3 | 0.14 |
|  | 0.4 | 0.31 |
|  | 0.5 | 0.32 |
|  | 0.6 | 0.17 |
|  | 0.7 | −0.14 |
|  | 0.8 | −0.61 |

TABLE 2 average illuminance and uniformity generated from lamp system
with different length P of the connector assembly

| | length P of the connector assembly (cm) | | | | | | | |
|---|---|---|---|---|---|---|---|---|
| | 10 | 20 | 30 | 40 | 50 | 60 | 70 | 80 |
| average illuminance (lx) | 359 | 349 | 338 | 326 | 314 | 303 | 291 | 280 |
| uniformity | 0.459 | 0.482 | 0.505 | 0.527 | 0.548 | 0.567 | 0.584 | 0.6 |

In other embodiments, if the relationship between a hanging height of the lamp and the target object 500 (e.g. a shelf) is further considered, since the lamp system 100 is located obliquely above the target object 500, an angle θ of the light emitted by the lamp 200 (or the lamp 300) is related to the average illuminance and uniformity (the ratio of the minimum illuminance to the average illuminance). The angle θ is an included angle defined between a vertical line and a line which connects a bottom of the lamp 200 (or lamp 300) and a top of the target object 500. Therefore, the length L of the lamp and the length P of the connector assembly and the included angle θ satisfy the following formula $$\frac{1}{8}\tan\theta < -8P^2 + 6L \times P - 0.9L^2 < \frac{1}{2}\tan\theta. \quad (2)$$

If $-8P^2\ 6\ L \times P - 0.9L^2$ is smaller than $$\frac{1}{8}\tan\theta,$$

it means that the height of the lamp 200 (or lamp 300) is disposed relatively high, so that it is likely to cause the average illuminance to be less than 300 (lx), which cannot meet lighting requirements of shopping malls. If $-8P^2\ 6\ L \times P - 0.9L^2$ is greater than $$\frac{1}{2}\tan\theta,$$

it means that the height of the lamp 200 (or lamp 300) is relatively low, so that it is likely to cause a sense of oppression in the placement space of the target object 500.

It can be known from the embodiments of the present disclosure that the lamp system of the present disclosure mainly uses the design of the electrical connecting members of the connector assembly and the lamp to achieve an electric and signal transmission function required for the jump connection and function expansion of the lamps, thereby effectively saving the system cost, and completing the electrical connection between lamps or between the lamps and external devices in a simple installation method.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lamp assembly, comprising:
   a lamp, comprising:
      a frame body having an accommodating space;
      a light source assembly fixed on the frame body; and
      an electrical connector assembly disposed in the accommodating space and connected to the light source assembly, wherein the electrical connector assembly comprises a first connector and a second connector, and the first connector and the second connector are connected to each other by a power wire and a signal wire; and
   a connector assembly comprising an electrical connecting member, wherein the connector assembly is configured to be connected to the lamp and another lamp by the electrical connecting member,
   wherein the lamp has a length L, and the connector assembly has a length P, wherein the length L of the lamp and the length P of the connector assembly satisfy the following conditions:
   $-8P^2 + 6L \times P - 0.9L^2 > 0$.

2. The lamp assembly of claim 1, wherein
   the electrical connecting member of the connector assembly comprises a third connector and a fourth connector, and the third connector and the fourth connector are connected to each other by another power wire and another signal wire; and
   the third connector of the connector assembly is electrically and signally connected to the second connector of the lamp, and the fourth connector is electrically and signally connected to the another lamp.

3. The lamp assembly of claim 2, wherein the connector assembly further comprises an external terminal which is connected between the third connector and the fourth connector, and the external terminal is electrically and signally connected to an external device.

4. The lamp assembly of claim 1, wherein the lamp is hung obliquely above a target object, and an included angle θ is defined between a line connecting a bottom of the lamp and a top of the target object and a vertical line, wherein the length L of the lamp, and the length P of the connector assembly, and the included angle θ satisfy the following conditions:

$$\frac{1}{8}\tan\theta < -8P^2 + 6L \times P - 0.9L^2 < \frac{1}{2}\tan\theta.$$

5. The lamp assembly of claim 1, wherein
   the connector assembly comprises a casing and a bottom cover, and the casing has an inner space, and the bottom cover is configured to open or close the inner space; and
   the electrical connecting member is disposed in the inner space.

6. The lamp assembly of claim 1, wherein the light source assembly comprises a light-emitting unit and a light guide plate, wherein the light-emitting unit is disposed in the accommodating space, the light guide plate is connected to the frame body, and a light incident surface of the light guide plate is adjacent to the light-emitting unit.

7. The lamp assembly of claim 1, further comprising a supporting member, wherein a top surface of the lamp and a top surface of the connector assembly respectively have a groove, and one portion of the supporting member is embedded in the groove of the lamp, and the other portion of the supporting member is embedded in the groove of the connector assembly.

8. The lamp assembly of claim 1, wherein the lamp and the connector assembly respectively have a suspension member.

9. A lamp system, comprising at least two lamps and at least one connector assembly of claim 1.

10. The lamp system of claim 9, wherein
the first connector of an endmost one of the lamps is connected to an external power source; and
the electrical connector assembly of each of the rest of the lamps is connected to the electrical connecting member of its adjacent connector assembly so as to form a connection with the endmost one of the lamps.

11. A method for assembling a lamp system, comprising:
providing a lamp system of claim 9;
hanging suspension members located on two opposite ends of a main lamp of the lamps to a ceiling, wherein the first connector of the electrical connector assembly of the main lamp is connected to an external power source;
electrically and signally connecting a first end of the connector assembly to the second connector of the main lamp, and hanging a suspension member located on a second end of the connector assembly to the ceiling; and
electrically and signally connecting the first connector of a secondary lamp of the lamps to the second end of the connector assembly, and hanging a suspension member located on an end of the secondary lamp away from the connector assembly to the ceiling.

12. A method for disassembling a lamp system, comprising:
providing a lamp system of claim 9;
separating the electrical connector assembly of one of the lamps of the lamp system desired to be disassembled from the electrical connecting member of the connector assembly, wherein one end of the one of the lamps is fixed by a suspension member; and
separating the suspension member and the one of the lamps to remove the one of the lamps.

* * * * *